(No Model.) 2 Sheets—Sheet 1.
J. C. H. STUT.
ENGINE.

No. 442,835. Patented Dec. 16. 1890.

Witnesses
Inventor
John C. H. Stut (No Model.) 2 Sheets—Sheet 2.

J. C. H. STUT.
ENGINE.

No. 442,835. Patented Dec. 16, 1890.

Witnesses,
J. H. Kruse
H. C. Lee.

Inventor,
John C. H. Stut
By Deacy & Co.
Attys

UNITED STATES PATENT OFFICE.

JOHN CH. H. STUT, OF SAN FRANCISCO, CALIFORNIA.

ENGINE.

SPECIFICATION forming part of Letters Patent No. 442,835, dated December 16, 1890.

Application filed May 13, 1890. Serial No. 351,646. (No model.)

*To all whom it may concern:*

Be it known that I, JOHN CH. H. STUT, a citizen of the United States, residing in the city and county of San Francisco, State of California, have invented an Improvement in Engines; and I hereby declare the following to be a full, clear, and exact description of the same.

My invention relates to improvements in steam-engines; and it consists in certain details of construction whereby a series of engines connected with a single driving-shaft may be coupled together in such a way that any one or more of the engines may be uncoupled and the others coupled together, so as to be used while the disconnected engine or engines is or are out of use.

Figure 1:
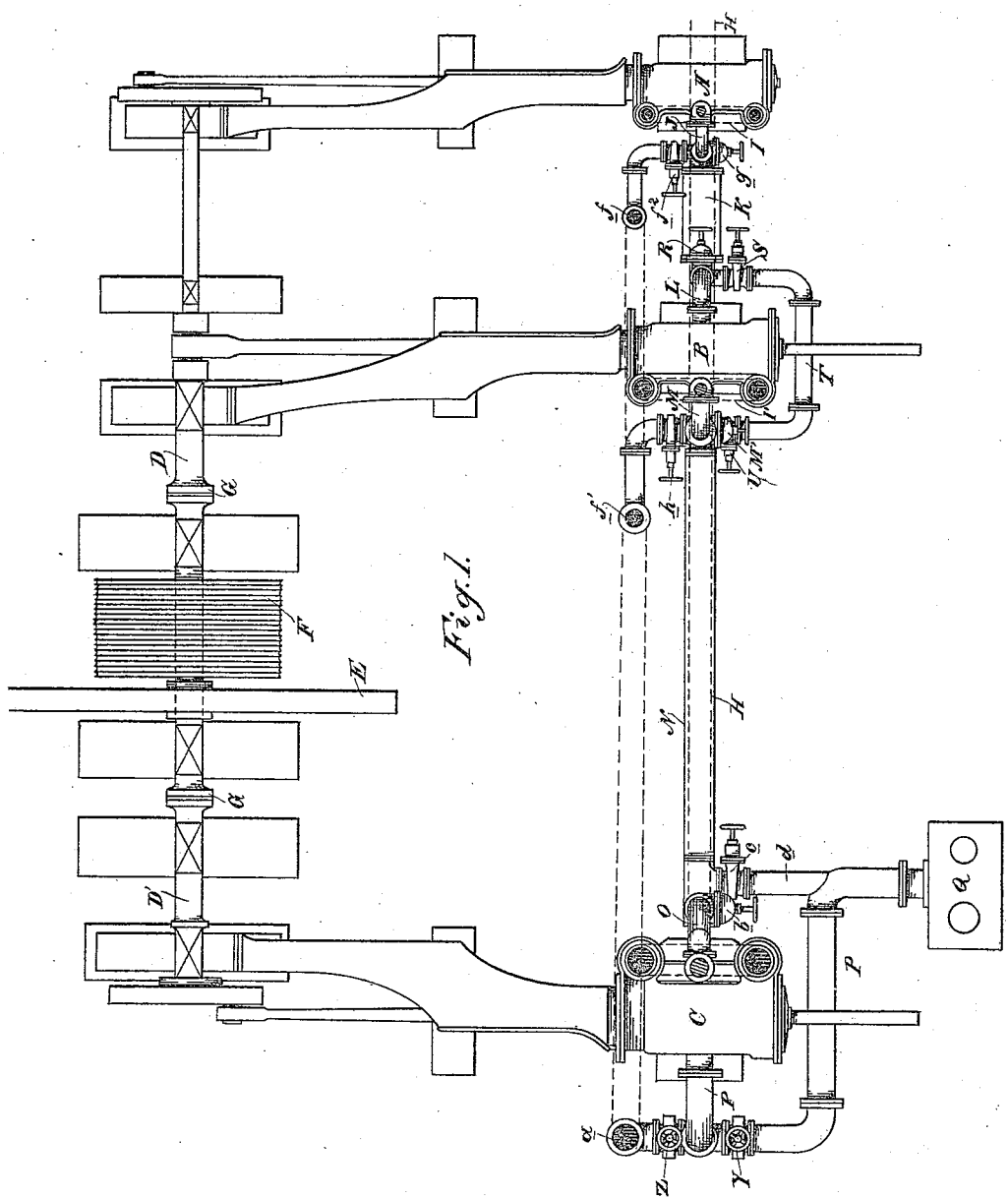
Figure 2:
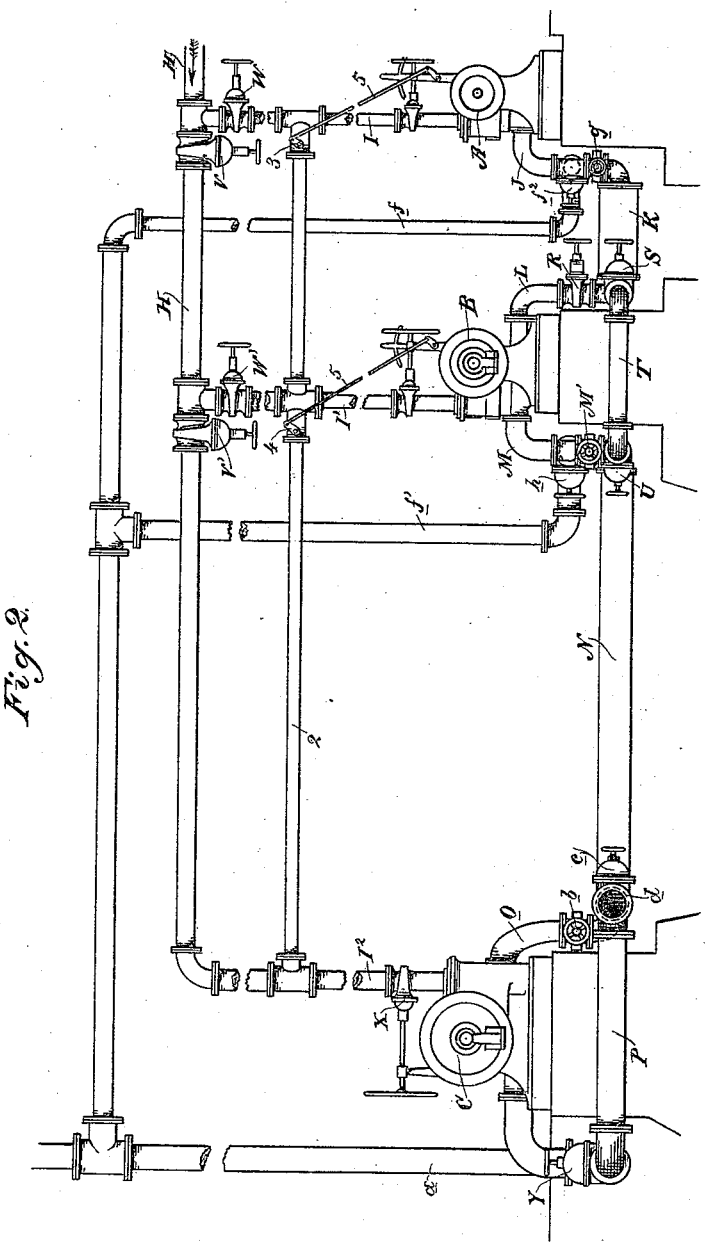

Referring to the accompanying drawings for a more complete explanation of my invention, Figure 1 is a plan view showing the arrangement of the engines and the connecting-pipes. Fig. 2 is an end elevation of the same.

For many kinds of work where it is necessary that no stoppage should be had for repairs, or on account of accidents, it is customary to build two complete sets of engines adapted to be connected with or disconnected from the same driving-shaft, so that in case of accident to either engine the others may be put into use at very short notice.

In my present invention I have designed a triple-expansion engine, each of the cylinders of which is so connected as to drive the same shaft, and by means of a series of pass pipes and valves I am enabled to cut out either engine and couple up the remaining ones, so that they will work together, while the other engine may remain idle for the purpose of repairs or for other reasons, or either engine may be used alone as a high-pressure by admitting steam directly into it. The same combinations may be made for four or more engines.

A, B, and C are the initial, intermediate, and expansion cylinders, each of which has the customary piston, piston-rod, and connecting-rod and is connected with a crank upon the main driving-shaft D D'. Upon this shaft are secured the balance-wheel E and the rope-driving grooved pulley F. Pillow-blocks and journal-boxes support the shaft upon each side of the pulley and balance-wheel, and couplings G outside of these two bearings enable me to disconnect the shaft at either of these points, if desired. The remaining portions of the shaft are also supported in suitable journal-boxes, so as to retain their proper alignment in case either portion is uncoupled, so that one or two of the engines may be run independently of the others and still drive the rope-pulley.

The usual course of the steam when the engines are connected together in the ordinary manner is through the main steam-pipe H, valve W, thence through the branch pipe I and throttle-valve into the initial cylinder, from which it is exhausted through the pipe J and valve $g$ into the receiver K, passing thence through the valve R and pipe L into the intermediate cylinder B, and being exhausted through the pipe M and valve M' into the receiver N, and thence passing through the valve $b$ and pipe O into the expansion-cylinder C, from whence it passes through the valve Y and pipe P to the air-pump and condenser, which are indicated at Q. If, however, for any reason it should be necessary to disconnect or cut out the intermediate cylinder B, it may be done by closing the valve R, through which steam is admitted from the receiver K to the intermediate cylinder B. At the same time the valves S and U are opened, thus allowing the steam to flow through them and the pipe T, which carries the steam around the cylinder B and delivers it through the valve U into the receiver N, whence it flows in the manner before described into the cylinder C, and the initial cylinder A and the cylinder C thus act together as a compound engine.

If it be found necessary to cut out the initial cylinder A and employ the two cylinders B and C together, the valve shown at W in the branch steam-pipe I is closed, thus cutting off communication between the main steam-pipe and the cylinder A. A valve V in the main steam-pipe is then opened, allowing steam to flow along the steam-pipe H and through the valve W' into the pipe I' and through the throttle-valve which supplies the intermediate cylinder B directly with steam. The valve V' remains closed and closes the pipe II beyond the pipe I'. The valve R, which controls the passage between the receiver K and the cylinder B being closed, and also valve U, steam will then be admitted directly to the cylinder B, from whence it exhausts into the receiver N, thence passing into the expansion-cylinder C, as previously described, when the two engines B and C will work together.

If it be desired to cut out both the engines A and B, steam may be supplied directly to the cylinder C through the pipe II by opening the valves V V' and X, the valves W and W', which supply either of the cylinders A and B, being closed. The expansion-cylinder C may then be used either as a condensing or non-condensing engine by allowing the exhaust to pass into the condenser, or, if desired, by closing the valve Y in the pipe which leads from the cylinder C to the condenser and opening the valve Z the steam may be allowed to exhaust directly through the pipe $a$ into the open air, thus converting the engine into a non-condensing one, and as the cylinder C is of large diameter it will be manifest that this cylinder, acting alone as a high-pressure engine receiving steam directly from the boilers at boiler-pressure, will have sufficient power to drive the machinery temporarily while the other two engines are inoperative. If this engine be used alone, the shaft may be uncoupled, if desired, to the right of the fly-wheel and rope-driving drum F, and only that portion connected with the engine C need be used.

If it be found necessary to cut out the engine C, it is done by closing the valve V' and the valve $b$, which admits steam from the receiver N to the cylinder C, and by opening the valve $c$ the steam is allowed to pass through the pipe $d$ into the condenser, and the two engines A and B then work together.

If it be desired to use any one or more of the engines without the condenser, the steam may be allowed to exhaust directly into the open air from the initial cylinder by means of the pipe $f$ and valve $f^2$, which receives the exhaust of the cylinder A. When the connection between that cylinder and the receiver K is cut off by the valve $g$, or when the cylinders A and B are used together, steam may escape by the pipe $f'$ and valve $h$, which receives the exhaust from the cylinder B, when the valve admitting steam into the receiver N has been closed and the valve $h$, connecting with the exhaust-pipe $f'$, has been opened.

If the engines A and B are used together and it is desired to stop the rotation of the shaft D', the coupling at the left of the fly-wheel E is disconnected and the fly-wheel and rope-driving drum will then be operated by the two engines A and B, while the engine C and that portion of the shaft D' will remain inoperative. By this arrangement it will be manifest that a great number of combinations may be made between the three or more cylinders which compose the set of engines, so that any one or more of them may be used independently of the others, either in connection with the condenser or as high-pressure engines exhausting directly into the atmosphere. This construction enables me to safely dispense with the second or duplicate set of engines held in reserve and only to be used in case of accident to the first set. It being improbable that all of the cylinders and their connections should become disabled at once, it will be manifest that, as before described, any one or more of them may be temporarily employed to do the work.

2 is a supplemental steam-pipe uniting the branch steam-pipes I I' I². This pipe has the pass-over valves 3 and 4, and by means of the connecting-rods 5 these valves are brought within easy reach of the engineer. Their object is to supply steam directly to the engines B or C in case the crank of the engine A is on a dead-center, and as the other cranks will then stand in a position to be operative I admit steam temporarily to one of the cylinders B or C to start the engine, after which the pass-over valves 3 or 4 may be closed. It will be manifest that these valves will be operated from the engineer's position by that engine which receives steam first.

Having thus described my invention, what I claim as new, and desire to secure by Letters Patent, is—

1. In an engine, a series of three or more cylinders set side by side and having each piston connected directly and independently with a common crank-shaft, a main steam-pipe with branches connecting with the valve-chambers of each of the cylinders, supplemental valves by which communication with each may be opened or closed independently, intermediate receivers into which the exhaust-steam from each cylinder may pass before entering the following one, a supplemental exhaust pass-pipe with branches and valves whereby any two or more of the cylinders may be connected independently of the others, and a condenser with which the cylinders are connected directly or in series, substantially as herein described.

2. In an engine, a series of three or more cylinders set side by side and having each piston connected directly and independently with a common crank-shaft, a main steam-pipe with branches connecting with the valve-chambers of each of the cylinders, supplemental valves by which each branch may be opened or closed, a supplemental and independent steam-pipe connecting the branch pipes between the main steam-pipe and the cylinders, and valves 3 and 4, by which steam may be admitted temporarily through the supplemental pipe to the second or following cylinder, substantially as herein described.

3. In an engine, a series of three or more cylinders set side by side and having each piston connected directly and independently with the crank-shaft, a main steam-pipe with branches connecting it with the valve-chambers of each of the cylinders, valves by which each branch may be opened or closed, receivers between each two cylinders, and valves and pipes by which the exhaust-steam from each cylinder may be conveyed to the adjacent receiver and thence to either of the following cylinders or receivers, or directly to a common condenser or to the open air, substantially as herein described.

4. A set of engines consisting of three or more cylinders having connecting pipes and receivers and condensers, whereby they may be used together as condensing-engines, a main steam-pipe having branches connecting, respectively, with each of the cylinders, valves whereby either of the branch pipes may be closed, other valves whereby the main pipe may be closed beyond either the first, second, or third branch pipe, valves whereby communication between the cylinders and receivers and the condenser may be cut off, and exhaust-pipes opening from the engines directly into the open air and having valves whereby they may be opened or closed, substantially as herein described.

In witness whereof I have hereunto set my hand.

JOHN CH. H. STUT.

Witnesses:
S. H. NOURSE,
H. C. LEE.